P. A. SOLEM.
FEEDING MECHANISM FOR WOODWORKING MACHINERY.
APPLICATION FILED DEC. 2, 1912.
1,109,186.
Patented Sept. 1, 1914.
4 SHEETS—SHEET 4.
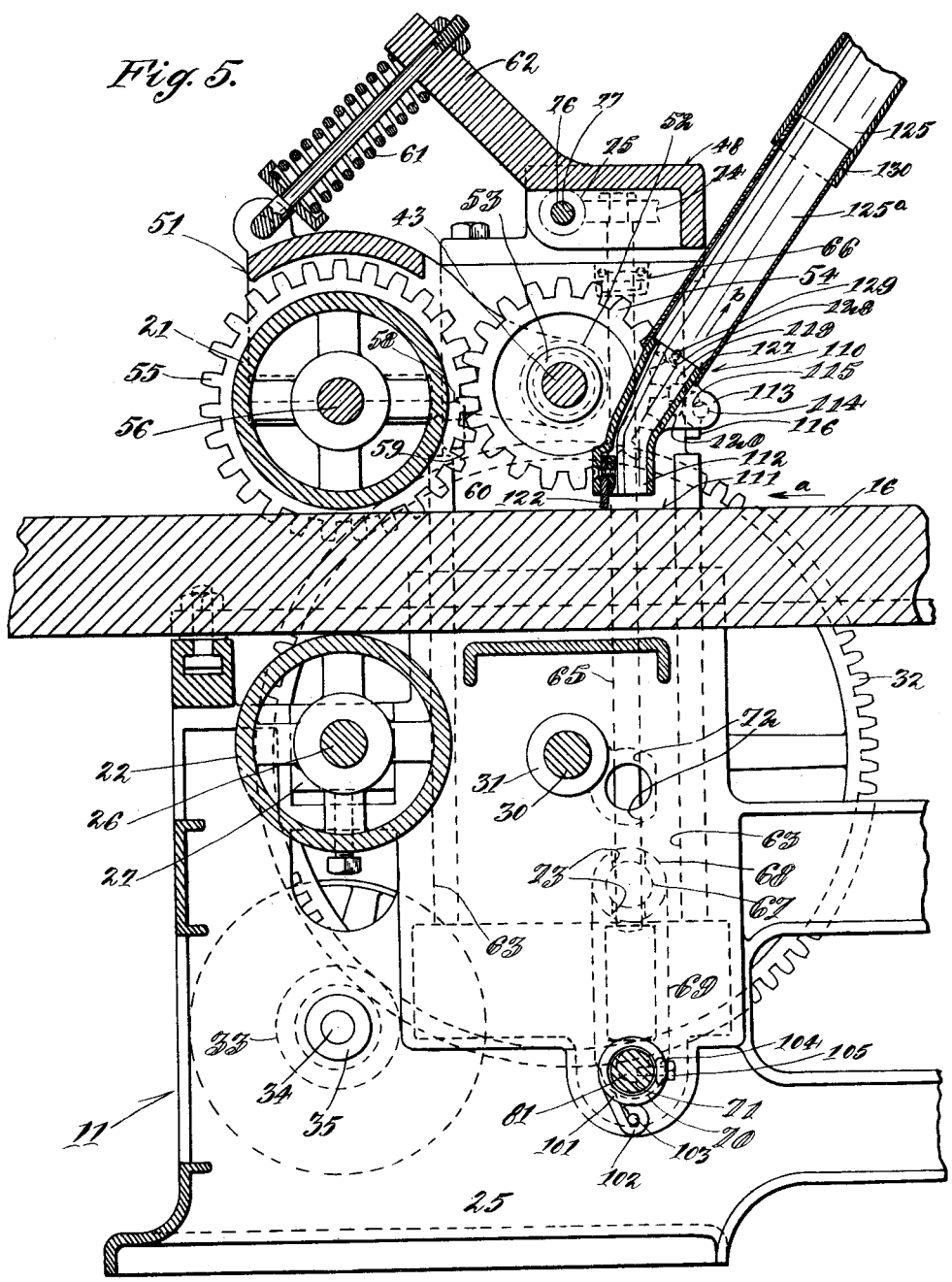

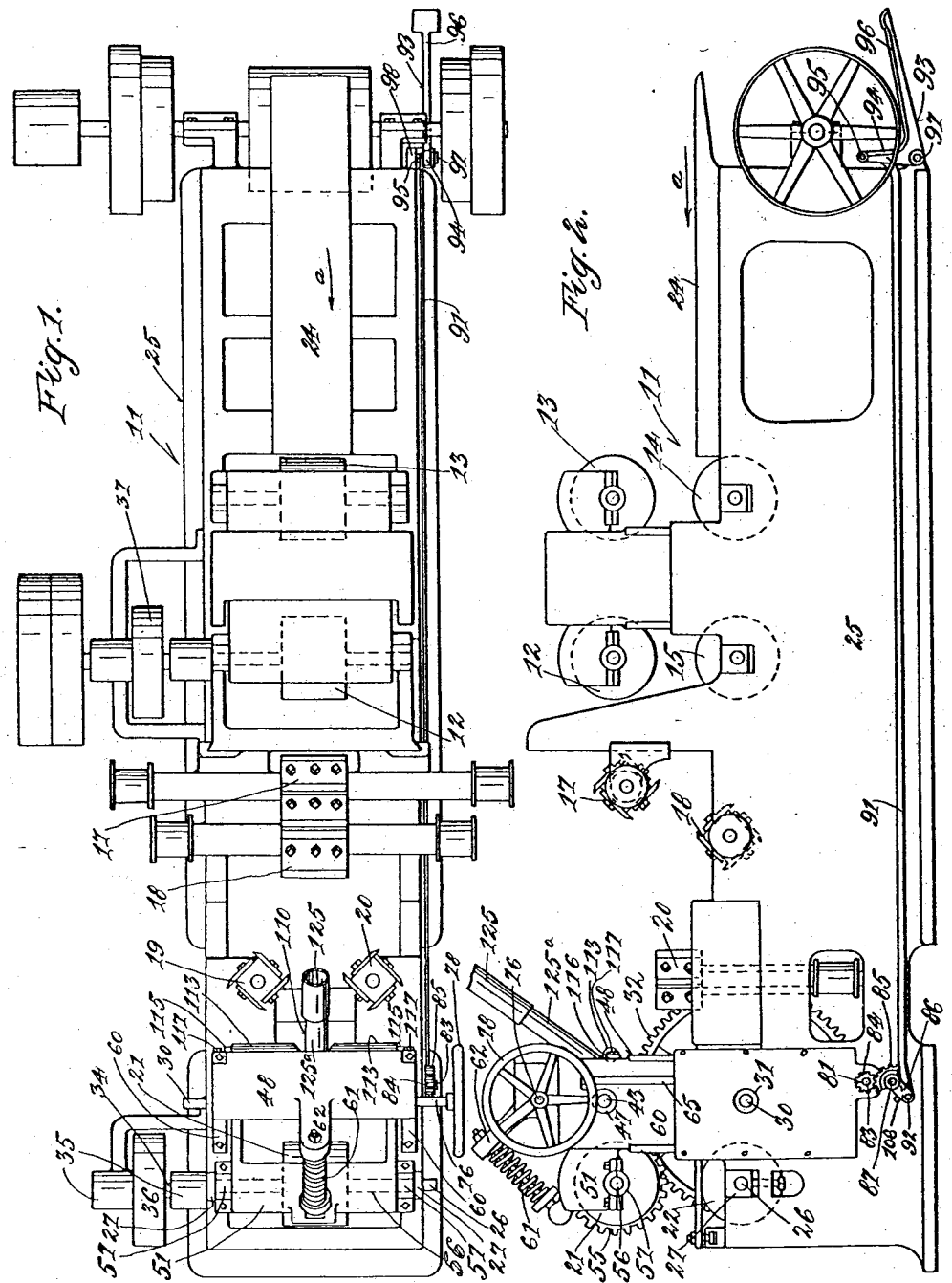

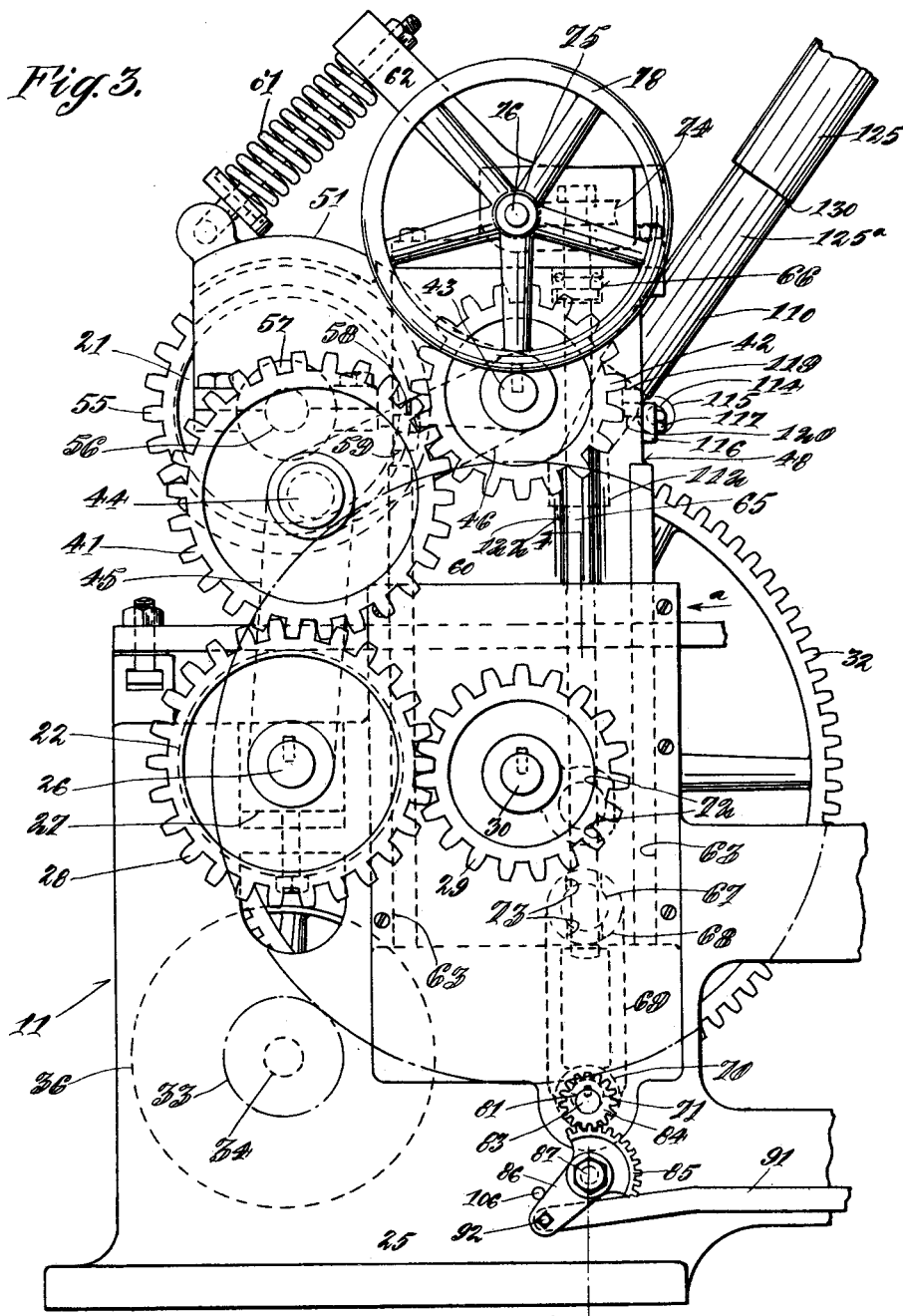

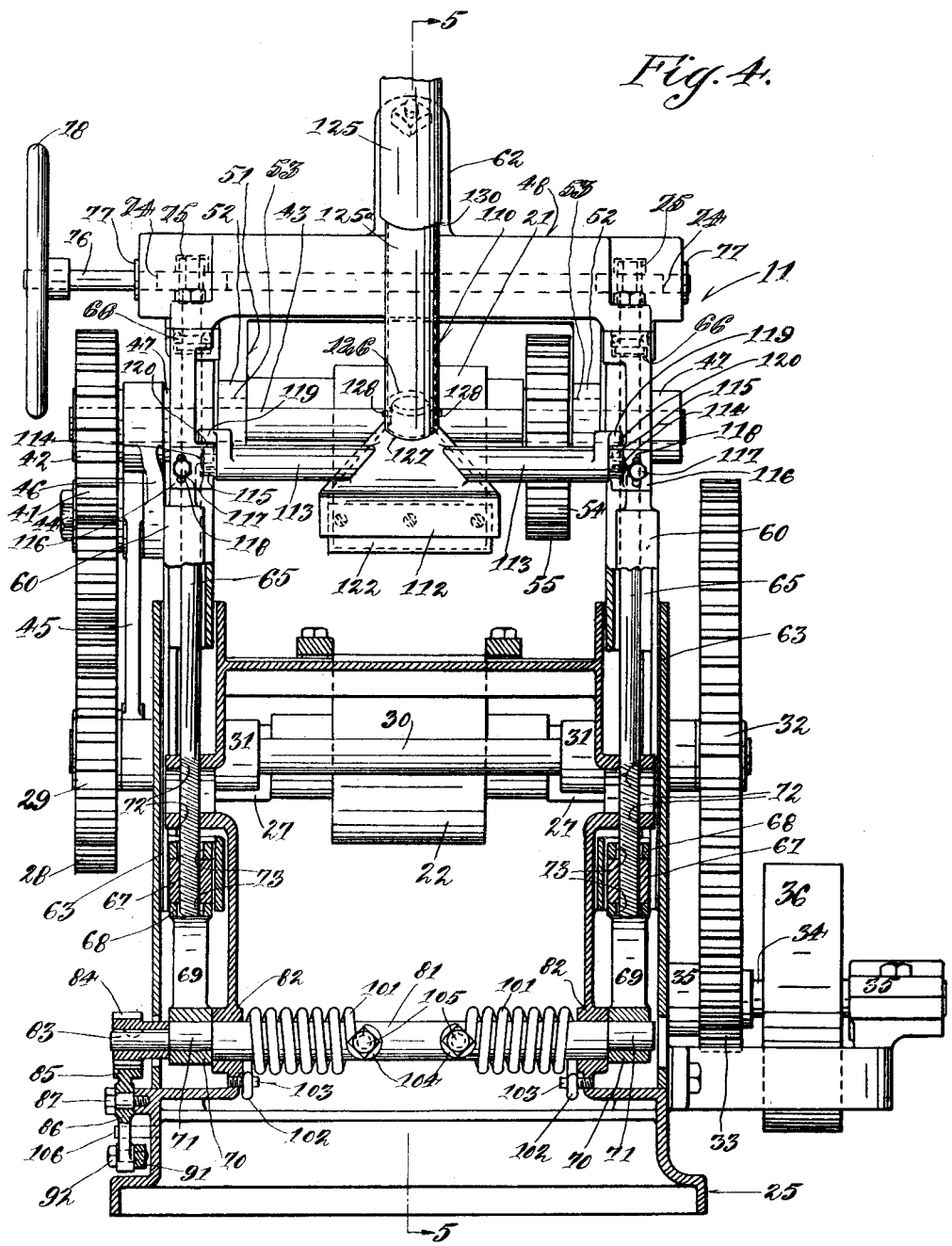

UNITED STATES PATENT OFFICE.

PETER A. SOLEM, OF CINCINNATI, OHIO, ASSIGNOR TO J. A. FAY & EGAN COMPANY, OF CINCINNATI, OHIO, A CORPORATION OF WEST VIRGINIA.

FEEDING MECHANISM FOR WOODWORKING MACHINERY.

1,109,186.      Specification of Letters Patent.      Patented Sept. 1, 1914.

Application filed December 2, 1912. Serial No. 734,518.

*To all whom it may concern:*

Be it known that I, PETER A. SOLEM, a citizen of the United States, residing at Cincinnati, in the county of Hamilton and State of Ohio, have invented certain new and useful Improvements in Feeding Mechanism for Woodworking Machinery, of which the following is a specification.

My invention is primarily applicable to the feeding mechanism in a wood-planing machine, located in that part of the machine in rear of a cutter-head or cutter-heads, and is primarily applicable to what is known in this art as a feed-out roll.

It is of course obvious that the invention may be employed in other relations in a woodworking machine if such should be desired.

It is the object of my invention to provide novel means whereby a feed-roll is normally held out of contact with the stock being fed through the machine and arranged so that the feed-roll may be temporarily brought into contact with said stock; further, to provide novel means for mounting, adjusting and moving the feed-roll support; further, to provide novel means whereby, after the feed-roll has been brought into contact with the stock, such contact is released; further, to provide a novel relation between a shaving chute and the feed-roll and novel means for mounting the shaving chute with relation to the feed-roll support; and the invention will be further readily understood from the following description and claims, and from the drawings, in which latter:

Figure 1 represents a plan view of a wood-planing and matching or flooring machine, in which the principal parts of the machine are diagrammatically shown in order to designate a usual location for the main parts of the machine, and also showing my invention applied thereto, the gearing for the latter being removed. Fig. 2 is a side elevation of the same. Fig. 3 is a side elevation of an embodiment of my invention as exemplified in a structure of the character shown in Figs. 1 and 2. Fig. 4 is an end elevation of the same partly in vertical cross-section on the line 4—4 of Fig. 3; and, Fig. 5 is a vertical section of the same on the line 5—5 of Fig. 4.

11 represents a wood-planing machine of desired character and is instanced as having feed-in rolls 12, 13, and 14, 15. These feed-rolls are mounted in suitable manner and rotated by suitable and usual means, not shown because well-known, for feeding the stock, shown at 16, in the direction of the arrow *a*.

17 represents an upper cutter-head, 18 a lower cutter-head, and 19, 20, side cutter-heads. One or more of these cutter-heads may be employed in connection with my invention and the same may be arranged and driven in ordinary or usual manner. Other suitable wood-cutting agency may be employed.

21, 22, represent a pair of feed-rolls which are arranged to act upon the stock after the same has been acted on by the cutter-head or cutter-heads.

It is usual in machines of this character for the stock to be fed upon and lengthwise of a table 24 in the main frame 25 of the machine and to rest upon the lower feed-roll or rolls in passing through the machine.

I have shown the feed-rolls 21, 22, as driven by power. Thus the feed-roll 22 has a shaft 26 which is journaled in bearings 27 and has a gear 28 secured thereto. The gear 28 is meshed by a gear 29 on a cross-shaft 30, journaled in bearings 31 of the main frame, the cross-shaft also having a gear 32 fast thereon which is meshed by a pinion 33 fast on a shaft 34 journaled in bearings 35 and having a pulley 36 fast thereon driven in suitable manner, as from a pulley 37 mounted on one of the shafts concerned in driving the feed-in rolls.

41 is an intermediate gear which meshes with the gear 28 fast on the lower roll-shaft 26 and with a gear 42 fast on a cross-shaft 43. The gear 41 is mounted on a stud 44 at the adjacent ends of links 45, 46, the distanced ends of said links being pivoted respectively about the roll-shaft 26 and the cross-shaft 43 for forming expansion-link mechanism between the lower feed-roll shaft and said cross-shaft. The cross-shaft 43 is journaled in bearings 47 of a feed-roll frame 48.

51 is a feed-roll housing which has bearings 52 about the cross-shaft 43, the bearings 52 being preferably journaled about the journal-ends 53 of the bearings 47 in which said cross-shaft 43 is journaled.

54 is a gear fast on the cross-shaft 43 and 55 is a gear fast on the roll-shaft 56 of the feed-roll 21, this last-named shaft being journaled in bearings 57 of the housing 51.

58 is a stop on each end of the housing arranged to engage a lug 59 on each of the side slides 60, of the feed-roll frame for limiting the downward movement of the housing and consequently of the feed-roll 21.

61 is a spring located between the feed-roll housing and a bracket 62 of the feed-roll frame for pressing said upper feed-roll downwardly toward the stock and permitting yield of the same with relation to the stock.

The feed-roll frame is adjustable up and down on the main frame, the side slides 60 being guided by guideways 63 in the main frame. This adjustment is shown accomplished by means of screw-rods 65, each of which is journaled in a bearing 66 in the feed-roll frame and has threaded connection with a nut 67 pivoted in a bearing 68 in a link 69, provided with a bearing 70 in which an eccentric 71 is journaled. The screw-rod may also be vertically movable in and guided by bearings 72 at a point adjacent to the nut 67, and pass loosely through openings 73 in the bearing 68, these openings being sufficiently large to permit the swinging of the link about the nut.

In the form shown, the upper end of each of the screw-rods has a worm-wheel 74 fast thereon meshed by a worm 75 on a cross-shaft 76 journaled in bearings 77 of the feed-roll frame and having a hand-wheel 78 thereon, whereby the screw-rods are turned and the feed-roll frame adjusted bodily up and down on the main frame of the machine.

81 is a rock-shaft on which the eccentrics are formed. It is journaled in bearings 82 on the main frame. This rock-shaft has an extension 83 which has a pinion 84 fast thereon, the rocking axis of the pinion and rock-shaft being coincident. The pinion is meshed by a segment-gear 85, the segment gear being on a lever 86 pivoted on a bolt 87 to the main frame. These parts are shown at the feed-out end of the machine. A link 91 is articulated at 92 to said lever and extends to a suitable part of the machine, as to the feed-in end of the machine, where it is connected to a suitable operating mechanism, shown as a bell-crank structure 93 comprising an arm 94 to which the link is articulated at 95 and a treadle-arm 96, this structure being rockable on a stud 97 located in a bearing 98 on the main frame.

Springs 101 are coiled about the rock-shaft 81, one end of each of the springs being provided with an eye 102, received about a pin 103 rigid in the main frame, the other end of each of the springs being provided with an eye 104 through which a bolt 105 passes into the rock-shaft. The construction and relation of the parts are such as to normally and automatically cause the eccentrics 71 to be located at their uppermost point of movement for locating the feed-roll 21 in raised position off the stock, and to cause the lever 86 to contact a stop 106.

110 is a pneumatic head, shown in the form of a shaving chute, through which a current of air is caused to pass, preferably in the direction of the arrow $b$ for drawing the shavings and slivers from the planed surface 111 of the board. If desired, the current of air may be reversed for blowing the shavings and slivers off the board. The pneumatic head, as shown, comprises the mouth 112 and the laterally extending cross-pieces 113. The head is pivoted on trunnions 114 in bearings 115 on bearing-blocks 116 secured to the feed-roll frame, as by bolts 117 passing through slots 118 in said block into said frame, permitting adjustment of the pneumatic head up and down on said feed-roll frame. The pneumatic head has a stop 119 at each end thereof arranged to engage a lug 120 on each of the side slides of the feed-roll frame.

The mouth 112 opens adjacent to the board and is provided with a lip 122, which is preferably a slightly flexible resilient lip, at the rear wall of the said mouth, extending across the width of the board, and acting as a shaving-wiper for the planed surface of the board, and being arranged to make close contact with said planed surface. This wiper is preferably fabric or reinforced rubber or leather and is arranged to wipe the shavings and slivers off the planed surface of the stock, to prevent them being pressed into said planed surface by the feed-out roll, when the latter is in active relation with the stock, and thereby avoid the marking and disfiguring of said planed surface.

125 is a pneumatic tube with which the pneumatic head has connection and which leads to any suitable suction or blower system. The connection between the pneumatic head and the pneumatic tube is preferably a loose connection to permit ready swinging of the pneumatic head. Thus the head is provided with a neck 126 with which a section 125$^a$ of the tube may have loose telescoping connection, as shown at 127, a pin 128 in the neck being received in a slot 129 in said section. The section 125$^a$ may have loose sliding telescoping connection with the tube proper, as shown at 130, if desired.

The object of pivoting the pneumatic head is to permit it to yield when the lip 122 is contacted by the stop, this lip, while being resiliently flexible being also preferably sufficiently stiff so as not to be unduly flexed when contacted by the stock. The pneumatic head is urged toward the stock by gravity in the form shown. A further object of pivoting the pneumatic head is to permit it to yield out of the way of obstructions, for instance an unduly tilted end of an advancing board.

The normal relation of the feed-roll 21 to the board or stock being fed through the machine, is shown in Fig. 5 of the drawings, this normal relation being a positioning of the feed-roll with relation to said board, so that the feed-roll is out of contact with said board. In this relation of the parts, the eccentrics 71 are located in upward position. In this relation of the parts the boards are arranged to feed one another through the machine by end contact by feeding force applied by the feed-in rolls 12, 13 and 14, 15, it being understood that suitable usual guides and pressure devices act on the stock in passing through the machine, these guides and pressure devices not being shown because well known. When the last board of the series passes beyond the feeding contact of said feed-in rolls, in order to feed the remaining portion of said board through the machine, the operator will manipulate the feed-roll 21, bringing the same into contact with the board, by bearing upon the treadle-arm 96, for drawing the feed-roll 21 downwardly, this being accomplished in the present exemplification by the downward movement of the feed-roll frame 48. The operator is enabled to apply great force for acomplishing this movement as he can apply his whole weight upon the treadle-arm, and can operate the feed-out roll from his usual position at the feed-in end of the machine. When this movement takes place, the pneumatic head preferably also moves toward the board, so that the flexible lip may form more intimate wiping contact with the planed surface of the end of the board for preventing passage of any shavings or slivers past said lip on the planed surface of the board.

When the end of the board is past the feed-roll 21, the operator releases the treadle-arm whereby the feed-roll 21 is automatically returned to normal position by means of the spring 101.

The feed-roll 21 being automatically returned to normal position out of contact with the stock, and such contact being effected only during manipulation of the contact means by the operator, it is assured that contact of said feed-roll with the planed surface of the stock shall be maintained only during the active manipulation of said contact means by the operator, thereby preventing negligent contact between said feed-roll and the planed surface of the board.

The pneumatic head and its wiper are adjustable with the feed-roll toward and from the stock, so that when the feed-roll is adjusted, the pneumatic head and its wiper are simultaneously adjusted with it, the pneumatic head being shown mounted on the feed-roll frame.

Having thus fully described my invention, what I claim as new and desire to secure by Letters Patent, is:

1. In a wood-working machine, the combination, with a wood-cutting agency, of a feed-roll at the feed-out end of the machine, means normally causing retraction of said feed-roll out of range of the stock passing through the machine, and means at the feed-in end of the machine operable to counteract said last-named means.

2. In a wood-working machine, the combination, with a wood-cutting agency, of a feed-roll frame at the feed-out end of the machine, a feed-out roll thereon, means normally causing elevation of said frame for positioning said feed-out roll out of operative contact with the stock passing through the machine, and means at the feed-in end of the machine operable to counteract said last-named means and thereby causing operative contact of said feed-out roll with said stock.

3. In a wood-working machine, the combination, with a wood-cutting agency, of a feed-out roll and a pneumatic head at the feed-out end of said machine, said pneumatic head in advance of said feed-out roll, means operable to counteract causing retraction of said feed-out roll and pneumatic head in a direction from the plane of the stock passing through the machine, and means at the feed-in end of the machine operable to counteract said last-named means.

4. In a wood-working machine, the combination, with a wood-cutting agency, of a feed-roll frame at the feed-out end of the machine, means for adjusting said feed-roll frame up and down, a feed-out roll and a pneumatic head located on and movable with said feed-roll frame, said pneumatic head located in advance of said feed-out roll, means normally raising said feed-roll frame into a normal raised position whereby said feed-out roll and pneumatic head are moved into retracted positions with relation to the stock passing through the machine, and means under control of the operator operable to counteract said last-named means.

5. In a wood-working machine, the combination of a wood-cutting agency, a feed-roll in rear of said wood-cutting agency, means normally raising said feed-roll into position out of range of the stock comprising a rocker-element located adjacent to the vertical plane of said feed-roll, and means for forcing said feed-roll into stock-contacting position, said last-named means having operative connection with said rocker-element and comprising operating means under control of the operator and located at the feed-in end of the machine.

6. In a feeding device for wood-working machinery, the combination with a wood-cutting agency, a feed-roll, a rock-shaft, means for adjusting said feed-roll having operative connection with said rock-shaft, automatic means for yieldingly rocking said rock-shaft in a given direction for normally positioning said feed-roll in inoperative relation, and means for rocking said rock-shaft in the opposite direction.

7. In a feeding device for wood-working machinery, the combination, with a wood-cutting agency, of a feed-roll acting on the stock after said wood-cutting agency, an adjusting screw for adjusting the elevation of said feed-roll, a link having pivotal connection with said adjusting screw, an eccentric for said link, and means for rocking said eccentric and thereby causing longitudinal movement of said adjusting screw.

8. In a feeding device for wood-working machinery, the combination, with a wood-cutting agency, of a feed-roll acting on the stock after said wood-cutting agency, an adjusting screw for adjusting the elevation of said feed-roll, a link having pivotal connection with said adjusting screw, an eccentric for said link, means for rocking said eccentric, said last-named means comprising means for automatically causing rocking of said eccentric for normally locating said feed-roll in raised position.

9. In a feeding device for wood-working machinery, the combination, with a wood-cutting agency, of a feed-roll acting on the stock after said wood-cutting agency, adjusting screws for the latter, links having pivotal connections with said adjusting screws, eccentric supports for said links, and means for rocking said eccentric-supports.

10. In a feeding device for wood-working machinery, the combination of a feed-roll support, an adjusting screw for the latter, a link, an eccentric support for the latter, a pivoted adjusting nut between said link and adjusting screw, means for automatically rocking said eccentric support in one direction, and means for rocking said eccentric support in the opposite direction, under continuous resistance of said last-named means.

11. In a feeding device for wood-working machinery, the combination of a feed-roll, an adjusting screw at each end thereof, links respectively having operative connection with said adjusting screws, eccentric supports for said links, a spring or springs coiled about said eccentric supports for automatically rocking the same in a given direction and causing retraction of said feed-roll from the stock-position, and means for rocking said eccentric supports in opposite direction.

12. In a feeding device for wood-working machinery, the combination of a feed-roll frame, a feed-roll housing pivoted thereon, a feed-roll in said housing, an adjusting screw at each end of said frame, links respectively having operative connection with said adjusting screws, eccentric supports for said links, a spring or springs coiled about said eccentric supports for automatically rocking the same in a given direction and causing movement of said feed-roll frame for retraction of said feed-roll from the stock-position, and means for rocking said eccentric supports in opposite direction.

13. In a feeding device for wood-working machinery, the combination of a feed-roll, an adjusting screw at each end thereof, a link for each of said adjusting screws, a pivot-nut between each of said adjusting screws and the link therefor, eccentrics for said links, springs for said eccentrics for normally automatically moving said feed-roll out of stock-contacting position, and means for counteracting said springs.

14. In a wood-working machine, the combination with a wood-cutting agency, of a feed-roll acting on the stock after said wood-cutting agency, adjusting screws for raising and lowering said feed-roll, links, pivot-nuts between said adjusting screws and links, a rock-shaft comprising eccentrics for said links, a spring for automaically rocking said rock-shaft in a given direction for retracting said roll from the stock-position, a stop for said rock-shaft, and means for rocking said rock-shaft in the opposite direction comprising an operating device at the feed-in end of the machine.

15. In a wood-working machine, the combination, with a wood-cutting agency, of a feed-roll, a pneumatic head in advance of said feed-roll, and means for coincidently adjusting said feed-roll and pneumatic head.

16. In a wood-working machine, the combination, with a wood-cutting agency, of a feed-roll frame, a feed-roll and a pneumatic head in advance of said feed-roll mounted on said feed-roll frame, and means for raising and lowering said frame.

17. In a wood-working machine, the combination, with a wood-cutting agency, of a feed-roll frame, a feed-roll and a pneumatic head in advance of said feed-roll mounted on said feed-roll frame, and means for raising and lowering said frame, said feed-roll and pneumatic head having independent yielding movements.

18. In a wood-working machine, the combination, with a wood-cutting agency, of a pivoted feed-roll housing, a feed-roll therein, a pivoted pneumatic head coöperating with said feed-roll in advance thereof, said feed-roll housing and pneumatic head having independent yielding movements, and means for simultaneously adjusting said feed-roll housing and pneumatic head.

19. In a wood-working machine, the combination, with a wood-cutting agency, of a feed-roll, a pneumatic head comprising a wiper for the stock acting on the stock in advance of said feed-roll, and means for simultaneously adjusting said feed-roll and pneumatic head.

20. In a wood-working machine, the combination, with a wood-cutting agency, of a feed-roll, a pneumatic head comprising a mouth and a stock-wiper at the said mouth, the stock-contacting edge of said wiper being normally closer to the plane of the stock than the point of closest approach in the periphery of said feed-roll, and means for simultaneously adjusting said pneumatic head and feed-roll with relation to said plane of said stock.

21. In a wood-working machine, the combination, of a wood-cutting agency, a feed-roll frame, means for adjusting said frame up and down, a feed-roll and a pneumatic head yieldingly mounted on said frame and adjustable therewith, and stops for said feed-roll and pneumatic head respectively for limiting their approach toward the stock-position.

22. In a wood-working machine, the combination of a wood-cutting agency, a feed-roll frame, means for adjusting said feed-roll frame up and down, a feed-roll housing pivoted on said feed-roll frame, a feed-roll therein, and a pneumatic head pivoted on said frame in advance of said housing, said head comprising a stock-wiper in rear of said wood-cutting agency.

23. In a wood-working machine, the combination, of a wood-cutting agency, a feed-roll in rear of said wood-cutting agency, a pneumatic head coöperating with said feed-roll, means for automatically retractingly moving said pneumatic head with relation to the stock-position, and means counteracting said last-named means.

24. In a wood-working machine, the combination with a wood-cutting agency, of a feed-roll and a pneumatic head at the feed-out end of the machine, means for automatically moving said feed-roll and pneumatic head in a direction away from the stock-position, and means at the feed-in end of the machine having connection with and counteracting said last-named means.

25. In a wood-working machine, the combination of a wood-cutting agency, a feed-roll in rear of said wood-cutting agency, a pneumatic head coöperating with said feed-roll, and means for automatically causing retraction of said feed-roll and pneumatic head in a direction away from the stock-position.

26. In a wood-working machine, the combination of a wood-cutting agency, a feed-roll in rear of said wood-cutting agency, a pneumatic head coöperating with said feed-roll, means for automatically causing retraction of said feed-roll and pneumatic head in a direction away from the stock-position, and means for counteracting said last-named means.

27. In a wood-working machine, the combination of a wood-cutting agency, a feed-roll in rear of said wood-cutting agency, a pneumatic head coöperating with said feed-roll, means for automatically moving said feed-roll and pneumatic head retractingly in a direction away from the stock-position, and means for counteracting said last-named movement, said feed-roll and pneumatic head mounted for independent yielding movements.

28. In a wood-working machine, the combination of a wood-cutting agency, a feed-roll frame in rear of said wood-cutting agency, means for adjusting said feed-roll frame up and down, a feed-roll and a pneumatic head on said feed-roll frame, and means for adjusting said pneumatic head on said feed-roll frame.

29. In a wood-working machine, the combination of a wood-cutting agency, a feed-roll frame in rear of said wood-cutting agency, means for adjusting said feed-roll frame up and down, a feed-roll on said feed-roll frame, a pneumatic head, a pivot support on said feed-roll frame for said pneumatic head, and means for adjusting said pivot-support up and down on said feed-roll frame.

In testimony whereof, I have hereunto signed my name in the presence of two subscribing witnesses.

PETER A. SOLEM.

Witnesses:
CONSTANT SOUTHWORTH,
HAZEL BRAUNAGEL.

Copies of this patent may be obtained for five cents each, by addressing the "Commissioner of Patents, Washington, D. C."

Correction in Letters Patent No. 1,109,186.

It is hereby certified that in Letters Patent No. 1,109,186, granted September 1, 1914, upon the application of Peter A. Solem, of Cincinnati, Ohio, for an improvement in "Feeding Mechanism for Woodworking Machinery," an error appears in the printed specification requiring correction as follows: Page 3, line 99, strike out the words "operable to counteract" and insert the word *normally;* and that the said Letters Patent should be read with this correction therein that the same may conform to the record of the case in the Patent Office.

Signed and sealed this 22d day of September, A. D., 1914.

[SEAL.]
R. F. WHITEHEAD,
*Acting Commissioner of Patents.*